US011440998B2

(12) United States Patent
Liu et al.

(10) Patent No.: US 11,440,998 B2
(45) Date of Patent: Sep. 13, 2022

(54) METHOD FOR PURIFYING LIGNIN

(71) Applicant: GUANGZHOU YINNOVATOR BIOTECH CO., LTD., Guangzhou (CN)

(72) Inventors: Yunsi Liu, Guangzhou (CN); Ruizhe Zhang, Guangzhou (CN)

(73) Assignee: GUANGZHOU YINNOVATOR BIOTECH CO., LTD., Guangzhou (CN)

( * ) Notice: Subject to any disclaimer, the term of this patent is extended or adjusted under 35 U.S.C. 154(b) by 44 days.

(21) Appl. No.: 17/052,646

(22) PCT Filed: Sep. 26, 2019

(86) PCT No.: PCT/CN2019/108188
§ 371 (c)(1),
(2) Date: Nov. 3, 2020

(87) PCT Pub. No.: WO2020/108067
PCT Pub. Date: Jun. 4, 2020

(65) Prior Publication Data
US 2021/0179787 A1    Jun. 17, 2021

(30) Foreign Application Priority Data
Nov. 26, 2018   (CN) .......................... 201811418239.5

(51) Int. Cl.
*C08H 7/00*    (2011.01)
(52) U.S. Cl.
CPC ..................................... *C08H 6/00* (2013.01)
(58) Field of Classification Search
CPC ..................................................... C08H 6/00
See application file for complete search history.

(56) References Cited

U.S. PATENT DOCUMENTS

| | | | | |
|---|---|---|---|---|
| 4,764,596 A * | 8/1988 | Lora | ........................ | C08H 6/00 162/29 |
| 2013/0217869 A1* | 8/2013 | Ters | ........................ | C08L 97/02 562/478 |
| 2015/0166836 A1* | 6/2015 | Liu | .................... | C09D 197/005 524/76 |
| 2015/0183813 A1* | 7/2015 | Eskelinen | ................ | C08H 6/00 530/507 |
| 2016/0137680 A1* | 5/2016 | Thies | ..................... | B01D 11/00 530/507 |
| 2016/0298295 A1* | 10/2016 | Dybov | .................... | C07C 29/86 |
| 2016/0376300 A1* | 12/2016 | Grelier | .......... | C12Y 110/03002 435/156 |
| 2017/0130398 A1* | 5/2017 | Jansen | ............... | D21C 11/0007 |
| 2017/0247835 A1* | 8/2017 | Leschinsky | ........ | D21C 11/0007 |
| 2018/0215878 A1* | 8/2018 | Okano | ..................... | C08G 8/20 |
| 2019/0085006 A1* | 3/2019 | Krawczyk | ............. | C07C 309/43 |
| 2019/0241595 A1* | 8/2019 | Dahlstrand | ........... | C08L 97/005 |
| 2019/0241679 A1* | 8/2019 | Hallett | ..................... | C08B 1/003 |
| 2019/0382959 A1* | 12/2019 | Bergmark | ................. | C08L 3/04 |
| 2020/0071468 A1* | 3/2020 | Friedl | ................ | D21C 11/0007 |
| 2020/0255466 A1* | 8/2020 | Lintinen | .............. | B01J 13/0021 |
| 2021/0261742 A1* | 8/2021 | Harasek | ................ | C08L 97/005 |

FOREIGN PATENT DOCUMENTS

| | | |
|---|---|---|
| CN | 101712698 A | 5/2010 |
| CN | 101845064 A | 9/2010 |
| CN | 102261007 A | 11/2011 |
| CN | 103145999 A | 6/2013 |
| CN | 103275331 A | 9/2013 |
| CN | 104927067 A | 9/2015 |
| CN | 106750362 A | 5/2017 |
| CN | 108424529 A | 8/2018 |
| CN | 109456496 A | 3/2019 |
| EP | 2527532 A | 11/2012 |
| KR | 101521238 B1 | 5/2015 |
| WO | 2017108055 A1 | 6/2017 |

OTHER PUBLICATIONS

Fang et al. (Holzforschung, 2015, p. 1-8) (Year: 2015).*
Weinwurm et al. (Chemical Engineering Transactions, vol. 39, 2014, 583-588) (Year: 2014).*
Lu et al. (Food Chemistry, 131, 2012, 313-317) (Year: 2012).*
Aminzadeh et al. (Industrial Crops and Products, 112, 2018, 200-209) (Year: 2018).*
Chinese-language International Search Report and Written Opinion issued in counterpart PCT Application No. PCT/CN2019/108188 dated Dec. 3, 2019, with English translation (nine (9) pages).
First Search of Chinese Priority Application.
Chinese-language Office Action issued in counterpart CN Application No. 201811418239.5 dated Sep. 1, 2020, with English translation (ten (10) pages).
Zhou, Jin-mei et al. 2017. "Organic Solvent Purify Bagasse Lignin." Applied Chemical Industry. vol. 46, No. 8, p. 1447-1450.

* cited by examiner

*Primary Examiner* — Liam J Heincer
(74) *Attorney, Agent, or Firm* — David S. Bradin; Nexsen Pruet, PLLC

(57) ABSTRACT

The present document discloses a method for purifying lignin. The method comprises steps of solvent dissolution, ultrasonic vibration, centrifugal filtration, stirring in water at a constant temperature, and membrane filtration and drying. In the present application, lignin extracted from a plant fiber raw material using an organic solvent is added to a specific solvent, and is purified by sequentially performing the steps of ultrasonic vibration, centrifugal filtration, stirring in water at a constant temperature, and membrane filtration and drying. Any of the steps cannot be omitted and the sequence thereof cannot be reversed. The steps are efficiently coordinated to achieve a synergistic effect, so as to remove impurities in lignin, and significantly improve the purity of the lignin while maintaining a high purification yield. The invention has broad application prospects and high market value.

11 Claims, No Drawings

METHOD FOR PURIFYING LIGNIN

CROSS REFERENCE TO RELATED APPLICATIONS

This application is a 35 U.S.C. § 371 U.S. national phase entry of International Application No. PCT/CN2019/108188 having an international filing date of Sep. 26, 2019, which claims the benefit of Chinese Application No. 201811418239.5 filed Nov. 26, 2018, the contents of each of which are incorporated herein by reference in their entireties.

TECHNICAL FIELD

The present application belongs to the field of lignin preparation, and relates to a method for purifying lignin.

BACKGROUND

Traditional lignin is typically obtained by further processing the black liquor resulted from alkali pulping. The alkali pulping is consisting of processing raw materials at high temperature and high pressure and dissolving lignin in a digestion liquor, leading to severe pollution and high reagent costs. In addition to the existence of many impurities, the prepared industrial lignin has characteristics of low lignin content, low purity, small relative molecular mass, high dispersion, complex composition, water solubility, poor thermoplasticity and the like, which have hindered its downstream applications. While the technology of extracting lignin from a plant fiber raw material using an organic solvent method is environmentally friendly. Under certain conditions, the organic solvent can degrade the lignin in the plant fiber raw material such that the lignin and cellulose can be separated efficiently. The lignin prepared by the solvent method is easy to separate and has good reactivity. However, during the separation of the obtained crude lignin, some hemicellulose, various ions and impurities would adhere to the lignin and thereby affect its downstream applications.

The lignin is a natural high molecular product behind only cellulose in the yield, and has an estimated global yearly output of 150 billion tons derived from plant growth. However, in addition to the lignin, the crude lignin contains a great deal of saccharides and ash, and the presence of these substances has adverse effects on the storage and use of the lignin. For example, due to the presence of saccharides, the crude lignin tends to absorb moisture during storage, and leads to low early strength as a result of delayed coagulation when used as an additive for concrete, and affects the binding strength and curing time of an adhesive to varying degrees when used in synthesis of the adhesive. In order to improve the performances of lignin, the crude lignin needs to be purified. The related lignin products contain many impurities such as various inorganic salts, hemicellulose and oligosaccharides, and are dark in color. These impurities have various adverse effects on the performances of industrial lignin derivatives. The application of lignin will be limited unless the crude lignin is purified appropriately to improve the product purity. CN101845064A discloses a method for purifying industrial lignin. The method includes the following steps: silica gel is weighted and filled in a chromatography column, the industrial lignin to be purified is dissolved in water; the solution of the industrial lignin is sprayed onto the top layer of the silica gel in the chromatography column; after the solution of the industrial lignin penetrates into the silica gel, another layer of silica gel is laid on the top of the silica gel; deionized water is added to elute; an eluate is received separately depending on the color distribution, where a light-colored portion of the eluate is received in a first container and a subsequent brown eluate is received in a second container; then an acid solution is added to the silica gel column to elute until the silica gel turns white; an acid solution eluate is received in a third container; and the brown eluate in the second container is dried by distillation to obtain a purified industrial lignin product. CN103910766A discloses a method for preparing a poplar-derived acetic acid lignin through separation and purification. The method includes the following steps: poplar powder is digested at a normal pressure and a temperature of 109° C. with acetic acid and hydrochloric acid as digestion agents; then a dissolved lignin is recovered through precipitation in water; a resultant crude lignin is washed with ether and then treated with an aqueous alkali; and membrane separation is conducted to obtain the poplar-derived acetic acid lignin. CN103497295B relates to an in-situ ultrasonic polymerization preparation method for an industrial alkali lignin modified phenolic resin. The method is consisting of obtaining a purified alkali lignin by performing alkali dissolution, acid precipitation, centrifugation, washing and drying on an industrial alkali lignin solution with a mass fraction of 5-10%. However, the above-mentioned related technologies are associated with cumbersome steps and complicated operation which are not conducive to popularization thereof, and the yield and purity need to be further improved. Furthermore, the above-mentioned patents perform purification mainly with industrial lignin as raw materials, and thus are not suitable for solvent lignin. There are few reports about the purification methods of emerging organic solvent lignin in the related art.

Therefore, a simple and efficient method for purifying lignin designed to remove impurities and broaden the downstream application range of lignin suggests broad application prospects and huge market value.

SUMMARY

The following is a summary of the subject matter described herein in detail. This summary is not intended to limit the scope of the claims.

The object of the present application is to provide a method for purifying lignin. The method focuses on the physicochemical properties and impurity components of lignin, coordinates various technical means and simply and efficiently performs purification step by step, so as to significantly improve the yield and purity of the lignin, and thus has broad application prospects and huge market value.

To achieve this object, the present application adopts solutions below.

In a first aspect, the present application provides a method for purifying lignin. The method includes the following steps.

(1) A crude lignin is added to a purification solvent and ultrasonic vibration is performed to obtain a primary product;

(2) The primary product is centrifuged to obtain a supernatant and a solid precipitate, the solid precipitate is washed and filtered with the purification solvent, and a filtrate is mixed with the supernatant to obtain a secondary product;

(3) The secondary product is stirred in thermostated water bath to obtain a tertiary product;

(4) Distilled water is added to the tertiary product and stirred, followed by filtering through a filter membrane to obtain a cut-off precipitate.

(5) The cut-off precipitate is washed and dried to obtain a purified lignin.

Optionally, the crude lignin is a lignin extracted from a plant fiber raw material using an organic solvent, which includes, but is not limited to, organic acid lignin, alcohol lignin, ether lignin, phenol lignin, ester lignin or ketone lignin, optionally any one or a combination of at least two of ethanol lignin, organic acid lignin, acetone lignin or high boiling alcohol lignin.

Optionally, the organic acid lignin is acetic acid lignin.

Optionally, the high boiling alcohol lignin is ethylene glycol lignin and/or 1,4-butanediol lignin.

In the present application, the inventor has gone into depth into the advantages and disadvantages of lignin extraction and purification technologies in the related art in the long period of productive practice, and employs the lignin extracted from a plant fiber raw material through an organic solvent as the raw material, and screens purification solvents widely. According to the present application, the lignin is purified by sequentially performing the steps of ultrasonic vibration, centrifugal filtration, stirring in thermostated water bath, and membrane filtration and drying, with the steps being indispensable and in unchangeable sequence. With a synergistic effect achieved by efficient coordination between these steps, the method allows significant impurity removal from lignin and remarkably improved lignin purity while maintaining a high purification yield, and thus indicates broad application prospects and huge market value.

Optionally, the purification solvent is an organic solvent, and includes any one of organic acid, alcohol, ether, ester or dioxane.

Optionally, a mass concentration of the purification solvent is 30-100%, and for example, may be 30%, 40%, 50%, 60%, 70%, 80%, 90% or 100%, optionally 100%.

Optionally, a mass concentration of the primary product is 0.1-90%, and for example, may be 0.1%, 1%, 5%, 10%, 15%, 20%, 25%, 30%, 35%, 40%, 45%, 50%, 55%, 60%, 65%, 70%, 75%, 80%, 85% or 90%, optionally 30-90%, and further optionally 80-90%.

Optionally, the organic acid includes propionic acid, butyric acid, formic acid or acetic acid.

Optionally, the alcohol includes methanol, propanol, glycerol, isobutanol, ethanol, or n-butanol, optionally methanol or ethanol.

Optionally, the ether includes diethyl ether.

Optionally, the ester includes ethyl acetate or butyl acetate.

Optionally, the acetic acid lignin is purified using acetic acid.

Optionally, the ethanol lignin is purified using methanol.

Optionally, the acetone lignin is purified using diethyl ether.

Optionally, the ethylene glycol lignin is purified using ethyl acetate.

Optionally, the 1,4-butanediol lignin is purified using ethanol.

Optionally, a temperature for the ultrasonic vibration in step (1) is 20-80° C., and for example, may be 20° C., 30° C., 40° C., 50° C., 60° C., 70° C. or 80° C., optionally 40-60° C.

Optionally, a duration of the ultrasonic vibration in step (1) is 10-200 min, and for example, may be 10 min, 20 min, 50 min, 70 min, 90 min, 110 min, 130 min, 150 min, 170 min, 190 min or 200 min, optionally 50-150 min.

Optionally, a rotation speed for the centrifuging in step (2) is 6000-20000 r/min, and for example, may be 6,000 r/min, 7,000 r/min, 8,000 r/min, 9,000 r/min, 10,000 r/min, 11,000 r/min, 12,000 r/min, 13,000 r/min, 14,000 r/min, 15,000 r/min, 16000 r/min, 17,000 r/min, 18,000 r/min, 19,000 r/min or 20,000 r/min, optionally 8,000-15,000 r/min.

Optionally, a temperature of the thermostated water bath in step (3) is 20-80° C., and for example, may be 20° C., 30° C., 40° C., 50° C., 60° C., 70° C. or 80° C., optionally 40-60° C.

Optionally, a duration of the stirring in step (3) is 10-300 min, and for example, 10 min, 30 min, 50 min, 70 min, 90 min, 110 min, 130 min, 150 min, 170 min, 190 min, 210 min, 230 min, 250 min, 270 min, 290 min or 300 min, optionally 50-200 min.

Optionally, the stirring in step (3) refers to stirring at a certain rotation speed of $10\text{-}1000\ s^{-1}$ in thermostated water bath, which can be implemented by a stirrer or a high speed disperser.

Optionally, a solid-liquid ratio of the tertiary product to the distilled water is 1:(1-10), and for example, may be 1:1, 1:2, 1:3, 1:4, 1:5, 1:6, 1:7, 1:8, 1:9 or 1:10, optionally 1:(3-7).

Optionally, a molecular weight cut-off of the filter membrane in step (4) is over 1,000.

In the present application, the filtration device is not limited, which may be an ultrafiltration device or a conventional filtration device. The main purpose of the filtration device is to trap some impurities so as to achieve purification. The filter membrane optionally is a filter membrane with a molecular weight cut-off of over 1,000, optionally a filter membrane with a molecular weight cut-off of 1,000-10,000.

Optionally, a washing agent for the washing in step (5) is water and is not limited in amount as long as the cut-off precipitate is washed clean.

As an optional solution, a method for purifying lignin specifically includes the following steps.

(1) Crude lignin is added to a purification solvent with a mass concentration of 30-100% and ultrasonic vibration is performed at 20-80° C. for 10-200 min to obtain a primary product with a concentration of 0.1-90%.

In step (1), the purification solvent includes any one of organic acid, alcohol, ether, ester or dioxane, and the crude lignin is a lignin extracted from a plant fiber raw material using an organic solvent, which includes, but is not limited to, any one or a combination of at least two of organic acid lignin, alcohol lignin, ether lignin, phenol lignin, ester lignin or ketone lignin.

(2) The primary product is centrifuged at a rotation speed of 6,000-20,000 r/min to obtain a supernatant and a solid precipitate, the solid precipitate is washed and filtered with the purification solvent, and a filtrate is mixed with the supernatant to obtain a secondary product.

(3) The secondary product is stirred in thermostated water bath with a temperature of 20-80° C. at a shear velocity of $10\text{-}1,000\ s^{-1}$ for 10-300 min to obtain a tertiary product.

(4) Distilled water is added to the tertiary product with a solid-liquid ratio of 1:(1-10) and stirred for 1-10 min, followed by filtering through a filter membrane with molecular weight cut-off of over 1,000 to obtain a cut-off precipitate.

(5) The cut-off precipitate is washed and dried to obtain a purified lignin.

In a second aspect, the present application provides a lignin obtained from purification by the method as described in the first aspect.

Compared with the related art, the present application has the following beneficial effects.

The purification method provided in the present application is such a simple and efficient method that the hemicellulose, various ions and impurities are removed from the lignin effectively, demonstrating significantly improved lignin purity while maintaining a high purification yield. with a yield more than 80%, a low ash content and a purity more than 90%. The method has a simple operation procedure, reduced cost, is environmentally friendly and thus has extremely huge values of application and popularization.

Other aspects can be understood after the detailed description is read and understood.

DETAILED DESCRIPTION

To further elaborate on the technical means adopted and the effects achieved in the present application, the solutions of the present application are further described below through specific examples, but the present application is not limited to the scope of the examples.

Example 1

(1) Crude lignin that has been extracted using acetic acid was added to acetic acid with a mass concentration of 60% to prepare a solution, and ultrasonic vibration was performed at 60° C. for 100 min to obtain a primary product with a lignin mass concentration of 80%.

(2) The primary product was centrifuged at a rotation speed of 10,000 r/min to obtain a supernatant and a solid precipitate, the solid precipitate was washed and filtered with acetic acid with a mass concentration of 60%, and the resultant filtrate was mixed with the supernatant to obtain a secondary product.

(3) The secondary product was stirred in thermostated water bath with a temperature of 60° C. at a shear velocity of 800 $s^{-1}$ for 150 min to obtain a tertiary product.

(4) Distilled water was added to the tertiary product with a solid-liquid ratio of 1:5 and stirred for 5 min to precipitate lignin, and the mixed solution containing the precipitate was fed to a filter membrane device and filtered through a filter membrane with molecular weight cut-off of 2,000 to obtain a cut-off precipitate.

(5) The cut-off precipitate was washed and then dried in a vacuum oven to obtain a lignin product with the solid content of over 85%.

Example 2

(1) Crude ethanol lignin was added to methanol with a mass concentration of 90%, and ultrasonic vibration was performed at 20° C. for 200 min to obtain a primary product with a lignin mass concentration of 60%.

(2) The primary product was centrifuged at a rotation speed of 8,000 r/min to obtain a supernatant and a solid precipitate, the solid precipitate was washed and filtered with methanol with a mass concentration of 90%, and the resultant filtrate was mixed with the supernatant to obtain a secondary product.

(3) The secondary product was stirred in thermostated water bath with a temperature of 20° C. at a shear velocity of 10 $s^{-1}$ for 300 min to obtain a tertiary product.

(4) Distilled water was added to the tertiary product with a solid-liquid ratio of 1:1 and stirred for 10 min to precipitate lignin, and the mixed solution containing the precipitate was fed to a filter membrane device and filtered through a filter membrane with molecular weight cut-off of 1,000 to obtain a cut-off precipitate.

(5) The cut-off precipitate was washed and then dried in a vacuum oven to obtain a lignin product with the solid content of over 85%.

Example 3

(1) Crude high boiling solvent (1,4-butanediol) lignin was added to ethanol with a mass concentration of 95%, and ultrasonic vibration was performed at 80° C. for 10 min to obtain a primary product with a lignin mass concentration of 30%.

(2) The primary product was centrifuged at a rotation speed of 15,000 r/min to obtain a supernatant and a solid precipitate, the solid precipitate was washed and filtered with ethanol with a mass concentration of 95%, and the resultant filtrate was mixed with the supernatant to obtain a secondary product.

(3) The secondary product was stirred in thermostated water bath with a temperature of 80° C. at a shear velocity of 1,000 $s^{-1}$ for 10 min to obtain a tertiary product.

(4) Distilled water was added to the tertiary product with a solid-liquid ratio of 1:10 and stirred for 1 min to precipitate lignin, and the mixed solution was filtered through a filter membrane with molecular weight cut-off of 5,000 to obtain a cut-off precipitate.

(5) The cut-off precipitate was washed and then dried in a vacuum oven to obtain a lignin product with the solid content of over 85%.

Example 4

(1) Crude acetone lignin was added to diethyl ether with a mass concentration of 100%, and ultrasonic vibration was performed at 20-80° C. for 80 min to obtain a primary product with a lignin mass concentration of 90%.

(2) The primary product was centrifuged at a rotation speed of 6,000 r/min to obtain a supernatant and a solid precipitate, the solid precipitate was washed and filtered with diethyl ether with a mass concentration of 100%, and the resultant filtrate was mixed with the supernatant to obtain a secondary product.

(3) The secondary product was stirred in thermostated water bath with a temperature of 40° C. at a shear velocity of $500^{-1}$ for 100 min to obtain a tertiary product.

(4) Distilled water was added to the tertiary product with a solid-liquid ratio of 1:3 and stirred for 8 min to precipitate lignin, and the mixed solution was filtered through a filter membrane with molecular weight cut-off of 8,000 to obtain a cut-off precipitate.

(5) The cut-off precipitate was washed and then dried in a vacuum oven to obtain a lignin product with the solid content of over 85%.

Example 5

(1) Crude ethylene glycol lignin was added to ethyl acetate with a mass concentration of 100%, and ultrasonic vibration was performed at 60° C. for 100 min to obtain a primary product with a lignin mass concentration of 80%.

(2) The primary product was centrifuged at a rotation speed of 20,000 r/min to obtain a supernatant and a solid precipitate, the solid precipitate was washed and filtered with ethyl acetate with a mass concentration of 100%, and the resultant filtrate was mixed with the supernatant to obtain a secondary product.

(3) The secondary product was stirred in thermostated water bath with a temperature of 60° C. at a shear velocity of $500^{-1}$ for 100 min to obtain a tertiary product.

(4) Distilled water was added to the tertiary product with a solid-liquid ratio of 1:8 and stirred for 5 min, and the mixed solution was filtered through a filter membrane with molecular weight cut-off of over 1,000 to obtain a cut-off precipitate.

(5) The cut-off precipitate was washed and then dried in a vacuum oven to obtain a lignin product with the solid content of over 85%.

Comparative Example 1

Compared with Example 1, the conditions were the same as those in Example 1 except that the step of ultrasonic vibration was eliminated.

Comparative Example 2

Compared with Example 2, the conditions were the same as those in Example 2 except that the step of stirring in thermostated water bath was eliminated.

Comparative Example 3

Compared with Example 3, the conditions were the same as those in Example 3 except that the step of centrifugal filtration was eliminated.

Comparative Example 4

Compared with Example 1, the conditions were the same as those in Example 1 except that acetic acid was replaced with methanol.

Comparative Example 5

Compared with Example 4, the conditions were the same as those in Example 4 except that the filtering through a filter membrane was eliminated.

Comparative Example 6

Compared with Example 5, the conditions were the same as those in Example 5 except that after the solution was prepared in step (1), the operation of stirring in thermostated water bath in step (3) preceded the operation of ultrasonic vibration in step (1).

Experiment Test

The purity, yield and ash content of the purified lignin obtained in Examples and Comparative Examples were tested.

The yield was calculated from the absolute dry weight before and after purification. The purity was tested by ultraviolet spectrophotometry or infrared spectrophotometry. The ash content test was consisting of calculating the ash content after calcination at 800° C. for 3 h.

The results are shown in Table 1.

TABLE 1

| Samples | Yield % | Ash % | Purity % |
| --- | --- | --- | --- |
| Example 1 | 82 | 0.3 | 92 |
| Example 2 | 85 | 0.8 | 95 |
| Example 3 | 81 | 0.4 | 93 |
| Example 4 | 82 | 0.5 | 91 |
| Example 5 | 84 | 0.7 | 94 |
| Comparative example 1 | 71 | 1.5 | 75 |
| Comparative example 2 | 70 | 1.8 | 62 |
| Comparative example 3 | 51 | 1.9 | 53 |
| Comparative example 4 | 75 | 1.6 | 41 |
| Comparative example 5 | 70 | 2.0 | 45 |
| Comparative example 6 | 65 | 1.8 | 43 |

It can be learned from Table 1 that, Examples 1-5 where the crude lignin extracted using the organic solvent was purified in accordance with the technical solution provided in the present application, exhibited a yield above 80%, a product purity above 90%, and low ash content. In contrast, in the Comparative Examples 1, 2, 3 and 5 where any of these steps was eliminated, in Comparative Example 4 where a purification solvent other than those of the present application was used, and in Comparative Example 6 where the purification steps is in a sequence other than that of the present application, the purity and the yield of the product are significantly reduced, and the ash content is increased, so that the product is not suitable for downstream application, and the purpose of purification is not achieved. Therefore, the steps of the purification method provided in the present application are indispensable and in unchangeable sequence, and must coordinate with each other in order to achieve the efficient purification.

In summary, the present application provides a method for purifying lignin. In the method, lignin that has been extracted from a plant fiber raw material by an organic solvent process is added to a specified solvent, and is purified by sequentially performing the steps of ultrasonic vibration, centrifugal filtration, stirring in thermostated water bath, and membrane filtration and drying, with the steps being indispensable and in unchangeable sequence. With a synergistic effect achieved by efficient coordination between these steps, the method allows significant impurity removal from lignin and remarkably improved lignin purity while maintaining a high purification yield, and thus indicates broad application prospects and huge market value.

The applicant has stated that although the detailed method of the present application is described through the examples described above, the present application is not limited to the detailed method described above, which means that implementation of the present application does not necessarily depend on the detailed method described above.

What is claimed is:

1. A method for purifying lignin, comprising:
   (1) adding a crude acetone lignin to a purification solvent and performing ultrasonic vibration to obtain a primary product;
   (2) centrifuging the primary product to obtain a supernatant and a solid precipitate, washing and filtering the solid precipitate with the purification solvent, and mixing a filtrate with the supernatant to obtain a secondary product;
   (3) stirring the secondary product in a thermostated water bath to obtain a tertiary product;
   (4) adding distilled water to the tertiary product, stirring, and filtering through a filter membrane to obtain a cut-off precipitate; and (5) washing and drying the cut-off precipitate to obtain a purified acetone lignin;

wherein the purification solvent is an ether, and the ether comprises diethyl ether; and wherein in step (1) the acetone lignin is purified using diethyl ether.

2. The method according to claim 1, wherein the crude acetone lignin is extracted from a plant fiber raw material.

3. The method according to claim 1, wherein a mass concentration of the purification solvent is 30%-100%.

4. The method according to claim 1, wherein a mass concentration of the primary product is 0.1%-90%.

5. The method according to claim 1, wherein a temperature for the ultrasonic vibration in step (1) is 20-80° C.

6. The method according to claim 1, wherein a rotation speed for the centrifuging in step (2) is 6,000-20,000 r/min.

7. The method according to claim 1, wherein a temperature of the thermostated water bath in step (3) is 20-80° C.

8. The method according to claim 1, wherein a solid-liquid ratio of the tertiary product to the distilled water is 1:(1-10).

9. The method according to claim 1, wherein a molecular weight cut-off of the filter membrane in step (4) is over 1,000.

10. The method according to claim 1, specifically comprising:
  (1) adding crude lignin to a purification solvent comprising diethyl ether with a mass concentration of 30%-100% and preforming ultrasonic vibration at 20-80° C. for 10-200 min to obtain a primary product with a concentration of 0.1-90%;
  wherein the crude lignin is a lignin extracted from a plant fiber raw material;
  (2) centrifuging the primary product at a rotation speed of 6,000-20,000 r/min to obtain a supernatant and a solid precipitate, washing and filtering the solid precipitate with the purification solvent, and mixing a filtrate with the supernatant to obtain a secondary product;
  (3) stirring the secondary product in thermostated water bath with a temperature of 20-80° C. at a shear velocity of 10-1,000 $s^{-1}$ for 10-300 min to obtain a tertiary product;
  (4) adding distilled water to the tertiary product with a solid-liquid ratio of 1:(1-10), stirring for 1-10 min, and filtering through a filter membrane with a molecular weight cut-off of over 1,000 to obtain a cut-off precipitate; and
  (5) washing and drying the cut-off precipitate to obtain a purified lignin.

11. Lignin, wherein the lignin is obtained from purification by the method according to claim 1.

* * * * *